United States Patent
Åström et al.

(10) Patent No.: US 10,594,960 B2
(45) Date of Patent: Mar. 17, 2020

(54) MOTION ENCODER

(71) Applicant: SICK IVP AB, Linköping (SE)

(72) Inventors: Anders Åström, Linköping (SE);
Robert Forchheimer, Linköping (SE);
Mattias Johannesson, Linköping (SE)

(73) Assignee: SICK IVP AB, Linkoping (SE)

( * ) Notice: Subject to any disclaimer, the term of this patent is extended or adjusted under 35 U.S.C. 154(b) by 178 days.

(21) Appl. No.: 15/869,175

(22) Filed: Jan. 12, 2018

(65) Prior Publication Data
US 2018/0220085 A1 Aug. 2, 2018

(30) Foreign Application Priority Data
Jan. 27, 2017 (EP) ..................................... 17153641

(51) Int. Cl.
*H04N 5/355* (2011.01)
*G06T 7/246* (2017.01)
(Continued)

(52) U.S. Cl.
CPC .......... *H04N 5/355* (2013.01); *G01D 5/34746* (2013.01); *G01P 3/38* (2013.01);
(Continued)

(58) Field of Classification Search
CPC ..... G06T 7/246; G06T 2200/28; G06T 7/579; G06T 7/20; G06T 2207/10016;
(Continued)

(56) References Cited

U.S. PATENT DOCUMENTS

| 2014/0063247 A1 | 3/2014 | Bernal et al. |
| 2015/0035990 A1* | 2/2015 | Forchheimer ........... G06T 7/246 |
| | | 348/169 |
| 2015/0348279 A1 | 12/2015 | Fishwick et al. |

FOREIGN PATENT DOCUMENTS

| EP | 2 805 305 B1 | 4/2017 |
| JP | 09-166609 A1 | 6/1997 |
| WO | 2013/107525 A1 | 7/2013 |

OTHER PUBLICATIONS

Eklund et al., "VLSI Implementation of a Focal Plane Image Processor—A Realization of the Near-Sensor Image Processing Concept", IEEE Transactions on Very Large Scale Integration (VLSI), vol. 4, No. 3, Sep. 1996, pp. 322-335 (cited in specification on p. 5).

(Continued)

*Primary Examiner* — Obafemi O Sosanya
(74) *Attorney, Agent, or Firm* — Renner, Otto, Boisselle & Sklar, LLP

(57) ABSTRACT

Method and motion encoder for providing a measure indicative of motion of an object. The indicated motion is relative to an image sensing circuitry and in a direction that is perpendicular to an optical axis of the image sensing circuitry when the image sensing circuitry provides image frames sequentially imaging at least part of said object during the motion. The motion encoder obtains image data of a sequence of said image frames and then computes, for at least one pixel position of said sequence of image frames and based on the obtained image data, at least one duration value. Each duration value indicating a duration of consecutively occurring local extreme points in said sequence of image frames. The motion encoder then provides, based on said at least one duration value, said measure indicative of the motion.

17 Claims, 5 Drawing Sheets

(51) Int. Cl.
  *G01D 5/347* (2006.01)
  *G06T 7/20* (2017.01)
  *G01P 3/38* (2006.01)
  *G01P 13/04* (2006.01)
  *H04N 5/357* (2011.01)

(52) U.S. Cl.
  CPC .............. *G01P 13/045* (2013.01); *G06T 7/20* (2013.01); *G06T 7/246* (2017.01); *H04N 5/357* (2013.01)

(58) Field of Classification Search
  CPC ......... G01P 13/045; G01P 3/38; H04N 5/355; H04N 5/357
  See application file for complete search history.

(56) References Cited

OTHER PUBLICATIONS

Forchheimer et al., "Near-Sensor Image Processing: A New Paradigm", IEEE Transactions on Image Processing, No. 6, Nov. 1994, pp. 736-746.
Gamal et al., "Trends in CMOS Image Sensor Technology and Design", International Electron Devices Meeting Digest of Technical Papers, 2002, pp. 805-808 (cited in specification on p. 5).
Guilvard et al., "A Digital High Dynamic Range CMOS Image Sensor with Multi-Integration and Pixel Readout Request", SPIE-IS&T Electronic Imaging, vol. 6501, 2007, pp. 65010L-1 to 65010L-10 (cited in specification on p. 5).

\* cited by examiner

MOTION ENCODER

TECHNICAL FIELD

Embodiments herein relate to a motion encoder, i.e. a sensor configured to sense motion of an object moving by and encode the sensed motion into some data indicative of the motion, e.g. a speed estimate. In particular embodiments herein relate to a motion encoder based on sensing of light, which may be referred to as an optical or non-contact motion encoder.

BACKGROUND

Motion encoders can e.g. be used to find the speed of a conveyor belt, just to mention a straightforward and simple example. Normally a mechanical encoder connected to the conveyer motor would be used. However, if for some reason it is not allowed to have the encoder in physical contact, optical techniques based on sensing of light can be used instead. One solution is to use a Doppler laser, which is accurate but expensive. Another solution is to use a conventional camera, e.g. CCD based, and image processing, which is relatively less expensive but requires more processing and may still be a too costly option. Owing to the processing requirements, energy consumption may also be higher than what may be desirable, e.g. in case of a battery powered sensor. Hence, conventional solutions may make some application areas and use cases of no or less practical interest. Hence, relatively much processing is required for conventional optical motion encoders, and they are more costly and energy demanding than what may be desirable, at least in some situations.

SUMMARY

In view of the above, an object is to provide one or more improvements relating to a motion encoder.

According to a first aspect of embodiments herein, the object is achieved by a method, performed by a motion encoder, for providing a measure indicative of motion of an object. The motion being indicated is relative to an image sensing circuitry and in a direction that is perpendicular to an optical axis of the image sensing circuitry when the image sensing circuitry provides image frames sequentially imaging at least part of said object during the motion. The motion encoder obtains image data of a sequence of said image frames. The motion encoder computes, for at least one pixel position of said sequence of image frames and based on the obtained image data, at least one duration value. Each duration value indicating a duration of consecutively occurring local extreme points in said sequence of image frames. A local extreme point is present in a pixel position if an image data value of that pixel position is a maxima or minima in relation to image data values of at least two pixel positions that are closest neighbors to said pixel position. The motion encoder then provides, based on said at least one duration value, said measure indicative of the motion.

According to a second aspect of embodiments herein, the object is achieved by a computer program comprising instructions that when executed by a motion encoder causes the motion encoder to perform the method according to the first aspect.

According to a third aspect of embodiments herein, the object is achieved by a computer readable medium comprising the computer program according to the second aspect.

According to a fourth aspect of embodiments herein, the object is achieved by a motion encoder for providing a measure indicative of motion of an object. The indicated motion is relative to an image sensing circuitry and in a direction that is perpendicular to an optical axis of the image sensing circuitry when the image sensing circuitry provides image frames sequentially imaging at least part of said object during the motion. The motion encoder is configured to obtain image data of a sequence of said image frames.

The motion encoder is further configured to compute, for at least one pixel position of said sequence of image frames and based on the obtained image data, at least one duration value. Each duration value is indicating a duration of consecutively occurring local extreme points in said sequence of image frames. A local extreme point is present in a pixel position if an image data value of that pixel position is a maxima or minima in relation to image data values of at least two pixel positions that are closest neighbors to said pixel position. Further, the motion encoder is configured to provide, based on said at least one duration value, said measure indicative of the motion.

Embodiments herein may be described as based on an "inverse" computation of object motion, and based on what may be described as longevity, stability, or stay, of local extreme point, i.e. Local Extreme Points (LEPs), within pixels. The solution is rather non-complex in terms of required operations and very suitable for implementation on an NSIP architecture. This enables fast compact implementations that include both the image sensing circuitry and processing capacity within the same unit, e.g. chip. Hence it is, thanks to embodiments herein, possible to accomplish optical/non-contact motion encoders that are less expensive and less energy demanding than conventional such encoders. Also, with e.g. the Internet of Things (IoT) "revolution" expected to occur in a close future and its demand for sensors that are cost and energy efficient, sensors that are suitably implemented using NSIP, as in the present case, may be of particular interest. Hence, embodiments herein provide improvements with regard to conventional optical motion encoders.

BRIEF DESCRIPTION OF THE DRAWINGS

Examples of embodiments herein are described in more detail with reference to the appended schematic drawings, which are briefly described in the following.

DETAILED DESCRIPTION

Figure 1:
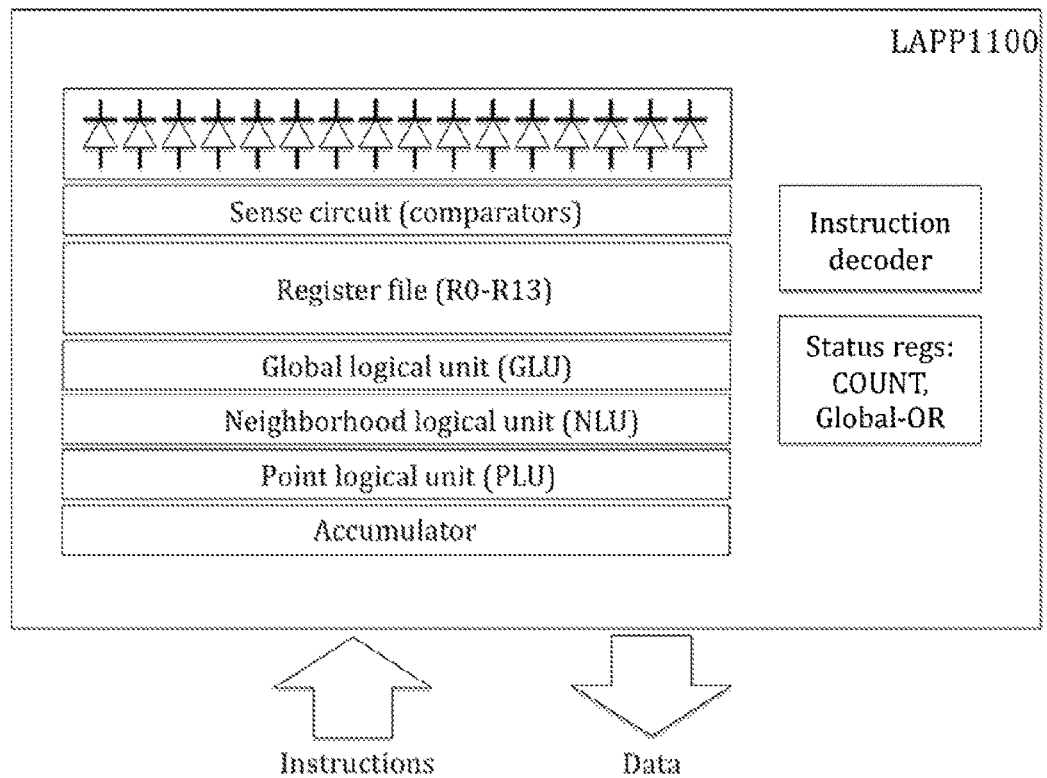
FIG. 1 is a schematic block diagram of an architecture of LAPP1100, the first commercial implementation of the Near Sensor Image Processing (NSIP) concept.

Throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

In the following, embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As part of a development towards embodiments herein, the situation and problems indicated in the Background will first be further elaborated upon.

The applicant has previously applied for, and get granted in some countries, patents regarding Time-to-impact (TTI) estimation, see e.g. WO 2013/107525. TTI aims at estimating the time when a possible collision may occur between a camera and an object seen by the camera when these are relatively moving towards, or away from, each other, the camera imaging the object by a sequence of images when it relatively approaches or moves away from the camera.

Conventionally the image processing required to perform real-time TTI estimation requires a fair amount of hardware resources, and the dynamic range of the camera needs to be high, particularly for outdoor applications. To compute spatial motion within the images, optical flow is typically estimated. To do this in real time requires fast computing hardware and data storage that can hold one or more frames.

The solution underlying said patented TTI estimation algorithm is instead based on an algorithm that estimates the "inverse" of the motion, i.e. how long an image feature stays at the same pixel position. The algorithm is based on identifying local extreme points or Local Extreme Points (LEPs). A local extreme point is present in a pixel position when an image data value of the pixel position is a maxima or minima in relation to image data values of at least two pixel positions that are closest neighbors to said pixel position. Owing to that operations could be independently performed on pixel positions and that the LEPs relate to very local data, computations could be made in parallel and implementation of the TTI algorithm were therefore well suited to be implemented on hardware architectures for parallel computing, for example Single Instruction Multiple Data (SIMD) type of processors. In particular implementations were well used for parallel architectures with processing capacity directly on or in close connection with images sensing circuitry, or even in close connection with single sensing elements. For example, the inventors could show that their LEP based approach with the TTI estimation algorithm drastically reduced computational load and also lend itself naturally to be implemented using a Near-Sensor Image Processing (NSIP) architecture, e.g. on an NSIP type of processor, which enables very cost efficient implementation and low power consumption.

Embodiments herein are based on an understanding that a similar approach as in the TTI case can be used to accomplish also an improved motion encoder, although the technical area, purpose of and result from TTI estimation are different than of motion encoders. Also, embodiments herein are suitably implemented on an NSIP architecture, as will be further discussed below.

The NSIP concept will now be explained in some detail since it will facilitate later understanding of embodiments herein and advantages thereof.

NSIP is a concept described for the first time about 30 years ago, in which an optical sensor array and a specific low-level processing unit were tightly integrated into a hybrid analog-digital device. Despite its low overall complexity, numerous image processing operations can still be performed at high speed competing favorably with state-of-art solutions.

FIG. 1 is a schematic block diagram of an architecture of the first commercial implementation of the NSIP concept, the LAPP1100 chip. It comprises 128 processor slices, one per pixel. Beside the light sensing circuitry, each slice contains a tiny arithmetic unit and 14 bits of storage. Image data can be read-out from a shift register but also tested for the occurrences of one or more set bits (Global-OR) or the total number of set bits (COUNT) within the 128 bit line image. There is no Analog to Digital (A/D) converter on board. Instead, if A/D conversion is part of an application based on the LAPP1100, it can be implemented in software using one of several different principles. One is based on utilizing the approximately linear discharge that each CMOS photo diode exhibited during exposure to light. A selected number of registers together with an arithmetic unit may then be used to implement parallel counters that, for each pixel stopped counting when the photo diode reached a predefined level. However, A/D conversion is often not necessary. Many tasks, such as filtering for certain features or performing adaptive thresholding may just as easily be done by utilizing a pixel readout circuit of the chip in combination with a small bit processor available at each pixel. Experiences related to the LAPP1100 have been summarized and published under the name of NSIP.

Figure 2:
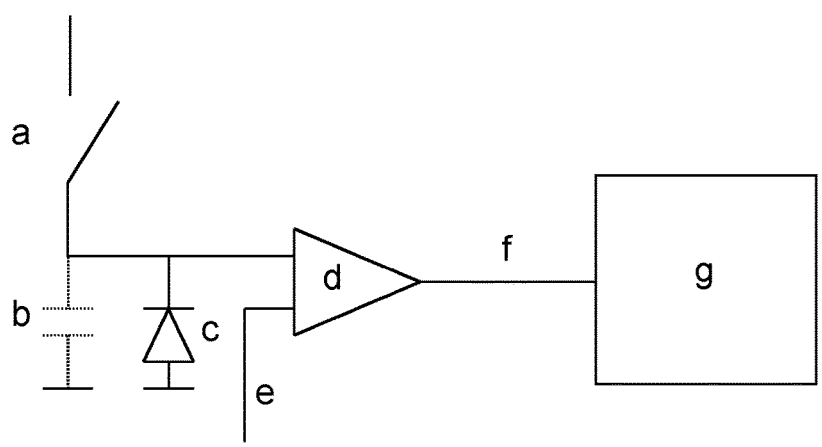
FIG. 2 schematically shows basic light sensing parts of the LAPP1100.

FIG. 2 schematically shows basic light sensing parts a-f of the LAPP1100 for providing image data of a pixel. The capacitor b represents an inherent capacitance of the photo diode c. When the switch a is on, the diode pre-charges to its full value. As the switch is turned-off and the photo diode discharge due to photo-induced current, the voltage on the input of the comparator d decreases. At some level, this voltage passes a reference voltage e and an output f switches its logical value corresponding to image data of the pixel. The output, i.e. the image data that is a bit value, may then be processed in the bit-serial arithmetic-logical unit g. The light sensing parts a-f may be considered to correspond to a light sensing element or pixel readout circuit, and the bit-serial arithmetic-logical unit g may be considered to correspond to a computing element that also may be named a pixel processor or bit processor. Many tasks, such as filtering for certain features, histogramming or doing adaptive thresholding can be performed by utilizing the pixel readout circuit in combination with the bit processor available for each pixel. The output from the pixel readout can be referred to as binarized image data when it represents information that the image intensity is above or below the threshold. However, the duration from pre-charge to output switching includes full, or at least more, information of the image intensity, which can be utilized by the processor for A/D conversion or other intensity-related operations. The concept naturally gives a high dynamic range as well as a very high frame rate.

When explaining the processor part of the NSIP architecture it may be convenient to view it as a single processor with a word length that is equal to the number of pixels in its sensor part. The main part of the processor is the register file containing register words of the size of said word length. A second register is the accumulator. Later implementations of NSIP also contain other and/or additional registers to enhance certain types of processing. A first class of simple operations is "point operations" such as AND, OR etc. They typically apply between a register and the accumulator, modifying the accumulator to hold the new result. A second class of typically very useful operations is the "local operations" by a Neighborhood Logical Unit (NLU) in which a 3-element template may be applied simultaneously over a register to form a low-level filtering operation. A 1-dimensional example of such an operation is an operation "(01x) R1" which compares the template (01x) against each position in the word and generates a logical 1 where the template fits and a logical 0 otherwise. This particular template checks that the bit position itself has the value 1 while its left neighbor is 0 and the right neighbor is allowed to be either 1 or 0, i.e. "don't care". This local operator may e.g. be useful when it comes to finding edges in an intensity image and also for finding local extreme points.

A third class of operations is "global operations". These are used for many different purposes such as to find the leftmost or rightmost 1 in a register or to zero all bits from a certain position or to set a group of consecutive zero bits. The global operations are all derived from the mark operation which uses two input registers as operands. Set bits in the first register are viewed as pointers to objects in the second register. Objects are connected sets of 1's. Objects which are pointed to, will be kept and forwarded to the result.

With the above-mentioned operations at hand, one can implement most of typical low-level image processing tasks. Instructions are issued one at a time from an external or chip-internal sequencer or microprocessor over e.g. a 16 bit bus. Processed images can e.g. be read-out over the same bus or a dedicated I/O channel. However, most often it is sufficient to compute some specific scalar value such as the position of an image feature, the highest intensity value, a first order moment etc. For this reason, an NSIP architecture often contains a count status, COUNT, which is configured to always reflect the number of set bits in the accumulator as well as a global-OR which indicates if one or more bits in the accumulator is set. Thanks to such status information, applications based on NSIP often do not need to read out complete conventional images from the chip, thus speeding up the applications considerably. As an example the sum of all values f(i), each e.g represented by b bits in the processors may be found using only b COUNT operations and appropriate scaling and summing of the COUNT results.

When implementing embodiments herein on the NSIP architecture introduced above, LEPs are extracted from image data. One of the simplest operations to extract a LEP is to find local minima in a 3×1 neighborhood. This means that if a center pixel has a lower intensity compared to both its neighbors, then this pixel is a LEP. As recognized, finding such local minima can be accomplished using a basic NSIP NLU-operation but can also be done using other sequential operations. Also thanks to the NSIP concept explained above, there will be a high dynamic range which facilitate finding local minimum values in both bright and dark regions.

The following disclosures are example of some further implementations based on the NSIP concept.

Eklund J-E, Svensson C, and Åström A, "Implementation of a Focal Plane Processor. A realization of the Near-Sensor Image Processing Concept" IEEE Trans. VLSI Systems, 4, (1996).

El Gamal A., "Trends in CMOS Image Sensor Technology and Design," International Electron Devices Meeting Digest of Technical Papers, pp. 805-808 (2002).

Guilvard A., et al., "A Digital High Dynamic Range CMOS Image Sensor with Multi-Integration and Pixel Readout Request", in Proc. of SPIE-IS&T Electronic Imaging, 6501, (2007).

Figure 3:
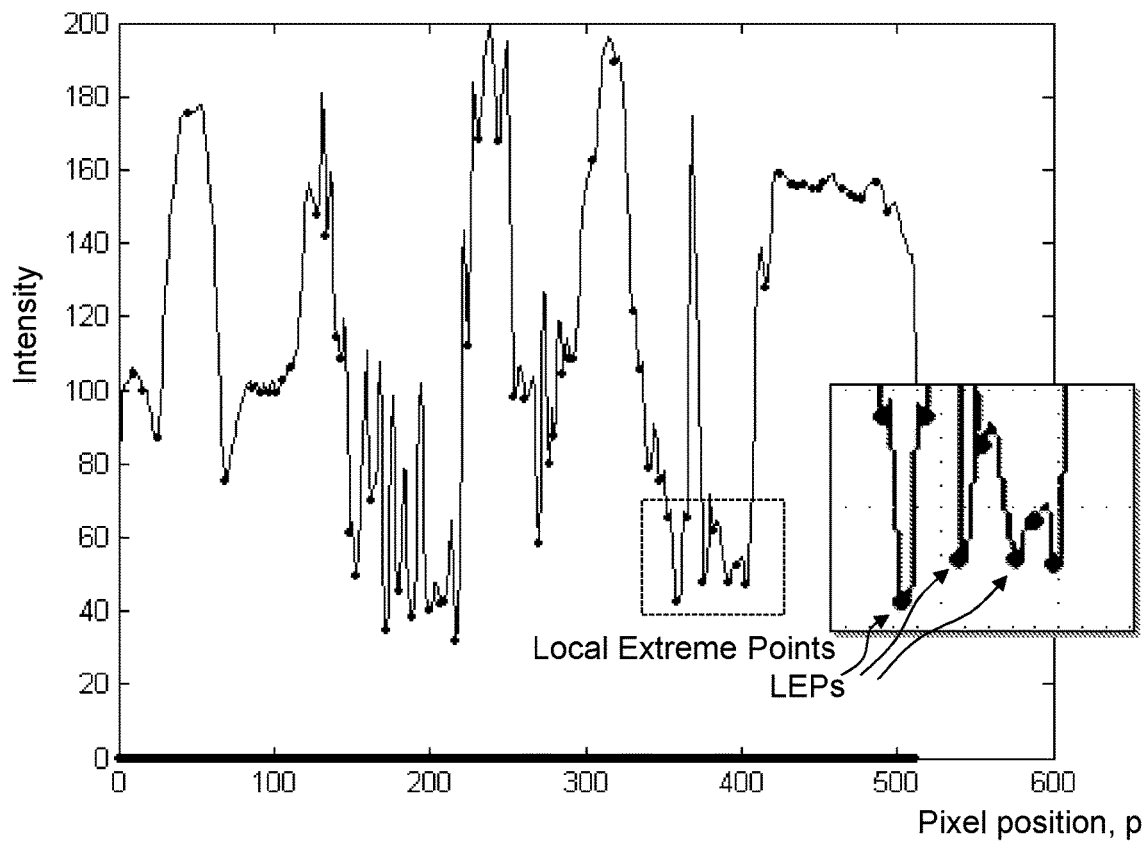
FIG. 3 is a diagram from a simulation just to illustrate Local Extreme Points (LEPs) in an image.

FIG. 3 is a diagram from a simulation just to illustrate LEPs in an image and for better understanding of LEPs. A row from a standard image has been taken and the LEPs have been marked. The LEPs have been identified in a local 3×1 neighborhood and correspond to local minima in this case. An NSIP operation to find the LEPs may be defined as (101) which means that if a center pixel has not passed its threshold but its two closest, i.e. nearest, neighbors have both passed the threshold, then the center pixel is a LEP that correspond to a local minimum point. In the figure, part of the image has been magnified to better illustrate the LEPs, indicated at black dots. Each row from the image used in the shown figure consisted of 512 pixels and in the shown particular case there are about 70 LEPs along an selected row.

Typical straightforward conventional steps to estimate motion, like conveyor belt speed, e.g. using a camera of an optical motion encoder, can be described by the following exemplifying algorithm:

a1. Take two pictures separated slightly in time and imaging the object during motion. Exposure settings need to be chosen such that some image contrast is obtained, for example in the case of the conveyor belt, either from the belt itself or from objects residing on it.

a2. Match the pictures using different pixel, or sub-pixel, displacements along the motion direction.

a3. Find the displacement corresponding to the best matching.

a4. Map the displacement to a correct metric displacement using calibration data.

a5. Determine the speed from the metric displacement and the time separating the pictures.

Embodiments herein are in contrast based on an algorithm for motion estimation of an object where the displacement is not measured in term of pixels between two consecutive images, but instead it is rather measured the time the object stays within a pixel distance. The pixel distance is given by the size of the sensing element on the image sensor used, which sensing element provides the image data of the pixel in question. The pixel distance will, as should be realized, correspond to an object distance, i.e. an actual or "real world" distance, e.g. metric distance, on the object, e.g. the conveyor belt, which e.g. can be found by calibration. To some extent this is based on the same underlying principle as the above mentioned TTI estimation algorithm. However, the TTI case relates to a situation where an object is relatively moving away from or towards an image sensor, i.e. in a direction parallel to an optical axis of the image sensor, while for a motion encoder case, the object is relatively moving by, i.e. in a direction that is perpendicular to the optical axis. It should also be noted that for embodiment herein, not the whole object need to be imaged, instead single pixel features in the form of LEPs are detected. It is tracked for how many frames they stay within the same pixel. The following is an exemplifying and a bit simplified algorithm that embodiments herein are based on:

b1. Identify a number of LEPs in image frames sequentially imaging the object during motion.

b2. Keep track of how many image frames each LEP stays inside the same pixel, i.e. are identified in the same pixel position, which may be named a "LEP run".

b3. Compute a representative measure, e.g. an average value, of the runs of all LEPs b4. Map the pixel distance to an actual distance on the object, e.g. corresponding to a metric distance on the object.

b5. Determine the speed from the actual distance, the representative measure, e.g. average value, and the time separating the image frames.

Figure 4:
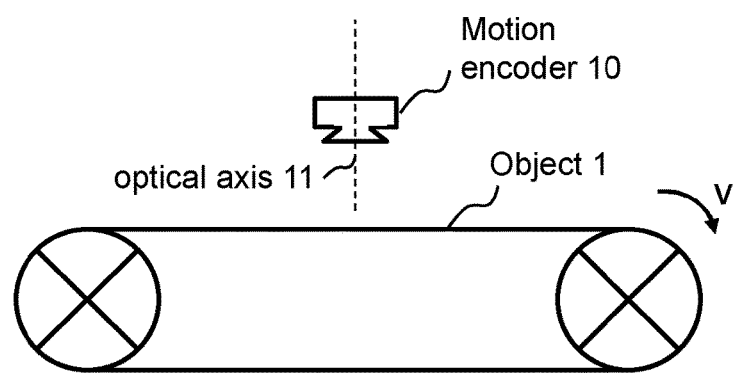
FIG. 4 schematically illustrates a situation where a motion encoder according to embodiments herein may be employed.

FIG. 4 schematically illustrates a situation where a motion encoder 10 according to embodiments herein, as discussed in detail further below, may be employed, namely to estimate speed of an object 1, here exemplified by a conveyor belt in motion and that moves with a speed v. In the shown figure, the motion encoder 10 comprises an image sensing circuitry (not shown), i.e. an image sensor, that may be part of a camera and that is imaging the object 1 in motion, e.g. when it moves with the speed v. The an image sensing circuitry may be as described below and preferably based on a NSIP architecture. Hence, preferably the image sensing circuitry (not shown) is integrated with the rest of the image encoder 10. However, some embodiments herein are applicable also when the actual motion encoder is separate and possibly remote from the image sensing circuitry, e.g. remote from a camera comprising it, and then operates on image frames provided by the image sensing circuitry. An optical axis 11 of the image sensing circuitry (not shown) comprised the motion encoder 10 is indicated in the figure. The motion to be encoded will be in a direction that is perpendicular to the optical axis 11, which will be better understood from what follows further below.

Figure 5:
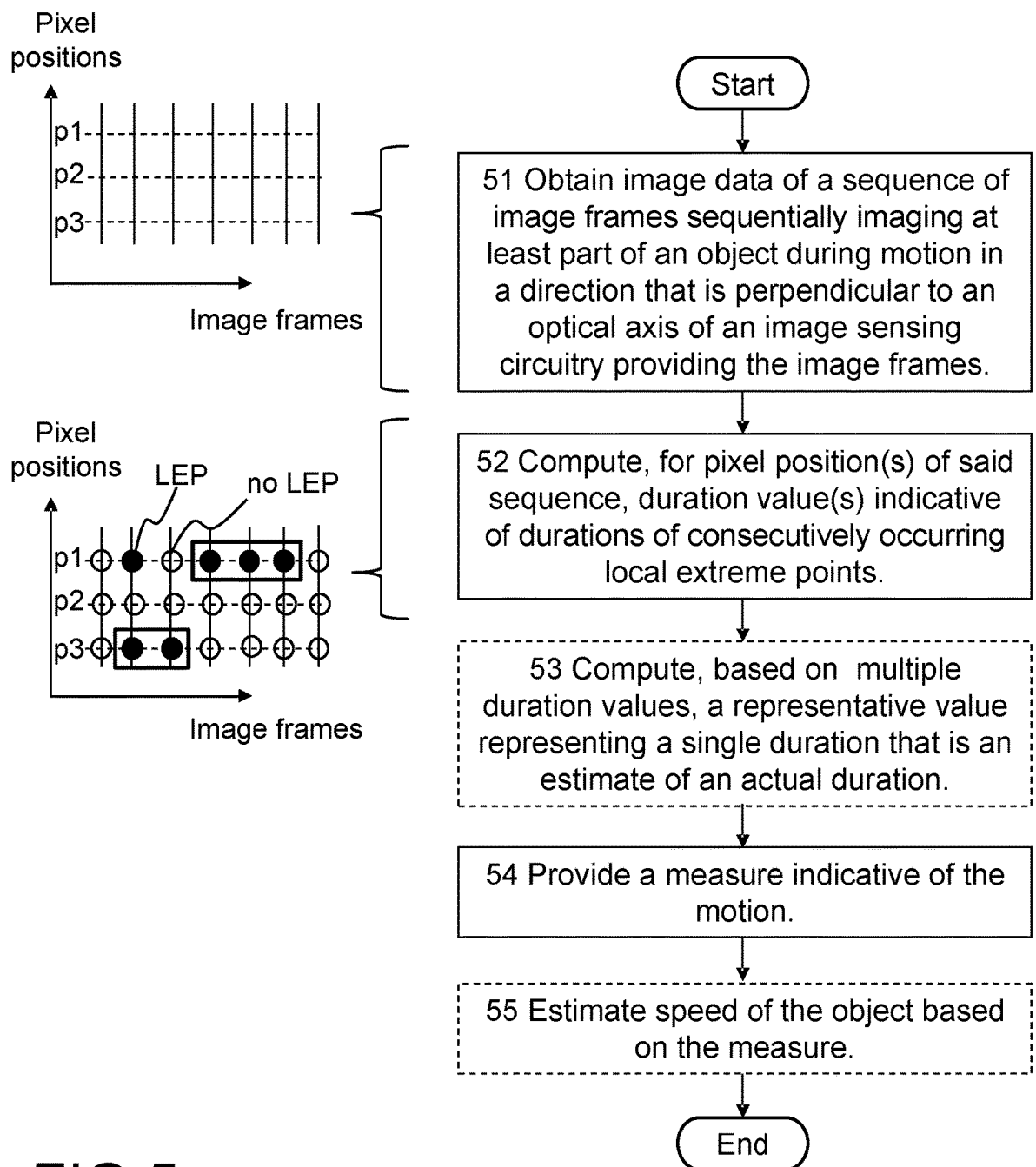
FIG. 5 is a flowchart schematically illustrating embodiments of a method according to embodiments herein.

FIG. 5 is a flowchart schematically illustrating embodiments of a method, performed by a motion encoder, e.g. the motion encoder 10, for providing a measure indicative of motion of an object, e.g. the object 1, such as a conveyor belt. The motion is relative to an image sensor and in a direction that is perpendicular to an optical axis, e.g. the optical axis 11, of an image sensing circuitry, e.g. image sensor, when the image sensing circuitry provides image frames sequentially imaging at least part of said object 1 during the motion. As indicated in FIG. 4 and as further exemplified below, the image sensing circuitry is advantageously part of the motion encoder 10, i.e. the motion encoder is advantageously comprising the image sensing circuitry.

The method comprises the following actions, which actions may be taken in any suitable order and/or be carried out fully or partly overlapping in time when this is possible and suitable. Note that the schematic illustrations to the left of some action boxes in the flowchart are merely simplified examples that have been added to just to facilitate understanding, but are not in any way to be considered as limiting what is stated in the actions below.

Action 51

The motion encoder 10 obtains image data of a sequence of said image frames. The image frames are thus sequentially imaging the object 1, e.g. the conveyor belt, during the motion in said direction, e.g. when it moves with a speed to be estimated in said direction. Obtaining the sequence implies that the motion encoder obtains image data associated with a respective image frame of the sequence of image frames.

A number of image frames to be obtained as the sequence may be predefined and/or predetermined and/or may even be determined during execution of the method, or part of the method, such as based on feedback, e.g. based on that at least a certain number of duration values, as discussed under the next action, have been computed and/or that one or two duration values occur substantially more often. The number of image frames may e.g. be determined as part of or in connection with a calibration procedure. Also, at installation of the motion encoder for use on a certain type of object and/or in a certain environment, case specific and available parameters may be tweaked, e.g. of the image sensing circuitry. The parameters may relate to sensitivity levels, thresholds, frame rate, light conditions etc, and may be adjusted during test runs and/or calibration of the motion encoder, until there is an acceptable number of image frames that should result in a suitable number of duration values as described below. In some situations with low noise and an object surface with almost no intensity variations, it may suffice that the sequence result in at least one duration value, in other situations it may be desirable with enough runs to result in that two duration values occur significantly and/or identifiably more often than other duration values, thereby indicating that a sequence with this number of image frames is able to produce usable information, as will be explained below.

In general, in presence of noise, a larger number of image frames in the sequence may enable a more accurate estimate of the average speed during the time period of the sequence. A drawback with larger numbers are more data to manage and process and a longer time, at the same frame rate, before the measure indicative of the motion can be provided. The sequence is in the figure schematically illustrated and exemplified by only 7 image frames. Typically, in practice, a much larger number, e.g. in the magnitude of hundred image frames or more, may be used.

Action 52

The motion encoder 1 computes, for at least one pixel position of said sequence of image frames and based on the obtained image data, at least one duration value. Each duration value indicates a duration of consecutively occurring local extreme points, i.e. LEPs, in said sequence of image frames. As already mentioned, a local extreme position, i.e. LEP, is present in a pixel position if an image data value of the pixel position is a maxima or minima in relation to image data values of at least two pixel positions that are closest neighbors to said pixel position.

The at least one duration value is typically multiple duration values. Each duration value can be considered indicative, and is typically a measure, of a LEP run, i.e. how long a local extreme point has stayed within a pixel during consecutive image frames of the sequence.

As used herein, a pixel is a smallest picture element of a picture, typically a digital image, e.g. of one of said image frames. A pixel is associated with a pixel position, i.e. a position of the pixel in the picture, and image data, e.g. one or more values, that correspond to one or more colors and/or intensity of the pixel. The pixel positions are the same for the image frames of the sequence, but each image frame has its own pixels, i.e. has its own image data in the pixel positions. In other words, the pixel positions are fixed but what is imaged, here the object in motion, and thereby the image data, changes with the motion, i.e. image data of pixels at the same pixel position can change between image frames. The image sensing circuitry providing the image frames typically contain one sensing element per pixel, which sensing element produces image data of the pixel. There may hence be correspondence between a pixel position and position of a sensing element providing image data of the pixel. The sensing elements are configured to sense light and in response thereto provide the image data of the pixels forming each image frame. Sometimes sensing elements of an image sensor are referred to as pixels of the sensor. See e.g. FIG. 6 and related text below for an example of how sensing elements can be arranged etc.

The present action can be considered to imply that there is identification of LEPs for one or more pixel positions during the sequence of image frames, which pixel positions thus are the same in every image frame of the sequence, and it is checked for each of these pixel positions how many LEPs that follow consecutively, i.e. that follow directly after each other, in the sequence. Each such occurrence of consecutive LEPs corresponds to a LEP run. Each duration value may thus be a value identifying a number of such consecutive LEPs, which as realized, corresponds to a number of image frames and may also be referred to as a LEP run. A LEP run for a pixel position ends when there is no longer a LEP in the pixel position. Each duration value may thus e.g. be an integer number identifying the number of consecutive LEPs or e.g. be a time value identifying the time between the first and last LEP of the LEP run.

For example, as schematically illustrated in FIG. 5, there may be three different pixel positions p1-p3, each for which duration values are computed. In principle any value indicative of a number of image frames may be used as duration value, but typically it is an integer value with unit "number of image frames. In the shown schematic example, there are two LEPs for pixel position p1, one with a duration of one image frame and one with a duration of 3 image frames. For pixel position p2 there is no LEP in the shown sequence. For pixel position p3 there is 1 LEPs with a duration of 2 image frames.

It may be advantageous if said at least two pixel positions, i.e. the at least two pixel positions that a LEP is identified in relation to, are aligned with each other and the pixel position of the local extreme point, e.g. are provided by sensing elements of the image sensing circuitry that are in the same column. Note that this is not visualized in FIG. 5 but may be better understood with reference to FIG. 6 and related text that follows below. In any case, such alignment facilitates and enables relatively simple and cost efficient implementation using NSIP, e.g. using a 1.5D NSIP with a single row of pixel processors serving image data from pixel columns respectively, e.g. based on a NSIP architecture that is described below in connection with FIG. 6. Said alignment corresponds to identifying a LEP in a pixel only in relation to closest neighboring pixels along the same line, e.g. in the same column. In other words, identification of LEPs is for these embodiments only made in a single direction that typically is predetermined. The motion to be indicated should be in this direction.

However, it should be noted that embodiments herein in general are functional also if LEPs are identified in relation to all closest neighboring pixels in the image plane, thus typically in relation to at least four closest neighboring pixels, such as at least the closest pixels above, below and to the left and to the right. In this case, the motion to be indicated can in principle be in any direction in the image plane. However in this case the benefits compared to a conventional image processing approach may be smaller or even insufficient. A possible drawback with LEPs being identified in relation to one direction only is that the motion must be in this direction to be detected, e.g. along columns of the image sensing circuitry, i.e., in practice that the image sensing circuitry, or the motion encoder 10 when the image sensing circuitry is comprised therein, should be arranged so this becomes the case in relation to the direction of an expected motion. In most situations this will be no problem and it can of course also be applied multiple motion encoders if it is desirable to be able to indicate motion in more than one direction.

Moreover, it may be advantageous if said at least two pixel positions additionally comprise the closest preceding and closest subsequent pixel positions and the second closest preceding and second closest subsequent pixel positions. Robustness to noise can be increased by including also the second closest neighbors.

In some embodiments, where the motion encoder 10 obtains the image data by reading the image data from the image sensing circuitry, preferably integrated with the motion encoder 10, and the image data of each pixel position is binarized image data provided by comparing a sensed level to a threshold, such as enabled in the LAPP1100, the noise robustness can be further improved by applying different thresholds. That is, different thresholds may be used for providing the binarized image data for the pixel position of the LEP and/or said closest pixel positions and/or second closest pixel positions.

Local extreme points, LEPs, duration values and advantages relating to implementation by NSIP are further described and exemplified below in relation to FIG. 6.

Action 53

In some embodiments, the at least one duration value is multiple duration values. The motion encoder 10 computes, for said at least one pixel position and based on said multiple duration values, a representative value representing a single duration that is an estimate of an actual duration. The representative value, typically a real or in practice floating point value, may be any value indicative of said single duration and thus typically have the same unit as the duration values, such as number of image frames.

In some embodiments, said at least one pixel position is multiple pixel positions and said representative value is thus representing a single duration based on said multiple pixel positions. The multiple pixel positions increases the possibility to capture LEP runs and makes the motion encoder useful in more situations. The multiple pixel position may e.g. correspond to all pixel positions of a line, such as a row, of the image sensing circuitry. This is discussed further in connection with FIG. 6 below. In this situation there may in practice first be provided a sub representative value per pixel position and that is representing a single duration value of this pixel position, and then a final representative value representing a single duration value for all of the multiple pixel positions.

In some embodiments, especially for implementation on an NSIP architecture, it may be advantageous if the representative value is based on duration values being identified as indicative of the longest duration per pixel position of said at least one pixel position during the sequence of image frames. Embodiments where the longest duration per pixel is utilized are further explained below. The duration values being identified as indicative of the longest duration per pixel position are examples of sub representative values as mentioned above.

In some embodiments the representative value is indicative of an average of duration values and may e.g. be based on, such as indicate, an arithmetic mean, a median or a mode, as should be recognized by the mathematically skilled person. The mode may be indicated by the most or two most frequently occurring duration value(s) among the multiple duration values. As should be realized, the two most frequently occurring duration values are typically two sequential integer numbers. In this case the representative value may further be based on a computed arithmetic mean or median of the two most frequently occurring duration values and/or may also be based on how often they occur in relation to each other.

For example, in the shown example with the three pixel positions p1-p3 and the 7 image frames, there are 3 LEPs with durations 1, 2 and 3 image frames, and hence the arithmetic mean is (1+2+3)/3=2 image frames.

As a further example, when the representative value, as mentioned above, is based on duration values being identified as indicative of the longest duration per pixel position, the representative value may be further based on, e.g. computed as, an arithmetic mean or median of these duration values. With reference to the shown example, this would mean that the representative value would be based on duration 3 for p1, duration 0 for p2 and duration 2 for p3. Hence an arithmetic mean would then be (3+2)/2=2.5. As this example indicates and as may be realized, this approach tend to result in representation of an average that has an error and is higher than the approach above and e.g. may result in speed estimations that are too high. However, an adjustment can be made to correct and compensate for this, as will be further discussed separately below.

If the representative value, as mentioned above, is based on duration values being identified as indicative of the longest duration per pixel position of said at least one pixel position, it may be advantageous if the representative value comprises an adjustment based on how many local extreme points that occur in said multiple pixel positions during the sequence of image frames. It can be shown, as will be discussed separately below, that the above mentioned error can be corrected or at least reduced by such adjustment. The adjustment thus enables correction or at least reduction of influence of a bias resulting from keeping the longest duration values and that else typically results in a too low speed estimate. The adjustment thereby enables improved accuracy.

In some embodiments, the representative value is based on counts of how many local extreme points that occur per duration value. This facilitates keeping a common count for each duration value, e.g. on a NSIP architecture, and that can be updated in run time, e.g. by pixel processors in case of the NSIP architecture. This in turn enables to let the number of image frames of the sequence to be determined based on the counts and thus also in run time. Thereby no more image frames than needed to produce a satisfactory and/or sufficient representative value may need be captured and/or used. The representative value may advantageously also be based on an identification of the two most frequently occurring duration values according to the counts. The representative value may then further also be based on relative distribution of the two most frequently occurring duration values, i.e. how frequently they occur in relation to each other. This enables computing a representative value that represents a duration that is a better estimate of the actual duration.

In some embodiments, the computation of the representative value excludes some of said duration values according to a certain criteria that e.g. may be predefined and/or predetermined. The exclusion enables a more accurate and/or more relevant, i.e. improved measure indicative of the motion, at least in some situations. It may e.g. be desirable to remove duration values that are apparently not relevant, e.g. that represent an unwanted motion, e.g. a speed in a range that is known not to be relevant or wanted, and/or that is associated with noise. E.g. duration values below a certain duration may be excluded or e.g. all duration values that do not belong to the most or the two most frequently occurring duration values.

Action 54

The motion encoder 10 provides, based on said at least one duration value, said measure indicative of the motion.

In some embodiments, where the representative value of Action 53 has been computed, said measure is based on, e.g. is, the representative value. In case there is only one duration value, the measure may be based directly on, e.g. be, this duration value.

Embodiments herein may be described as based on an "inverse" computation of object motion, and based on what may be described as longevity, stability, or stay, of LEPs within pixels. The solution is rather non-complex in terms of required operations and very suitable for implementation on an NSIP architecture. This enables fast compact implementations that include both the image sensing circuitry and processing capacity within the same unit, e.g. chip. Hence it is, thanks to embodiments herein, possible to accomplish optical/non-contact motion encoders that are less expensive and less energy demanding than conventional such encoders. Also, with e.g. the Internet of Things (IoT) "revolution" expected to occur in a close future and its demand for sensors that are cost and energy efficient, sensors that are suitably implemented using NSIP, as in the present case, may be of particular interest. Hence, embodiments herein provide improvements with regard to conventional optical motion encoders.

Action 55

The motion encoder 10 may then, based on the provided measure, estimate a speed of the object 1 in said direction, e.g. compute a speed estimation based on the provided measure.

As explained above, a pixel distance corresponds to an actual distance, e.g. a metric distance, on the object 1, i.e. an object distance, and the relation, i.e. how the pixel distance map to the actual distance, may be known from calibration and calibration data, e.g. carried out and/or obtained when installing the motion encoder 10 for use at a certain location. The relation may also be configured at installation and/or be predetermined, although it then may be required that the motion encoder 10 is to be installed at a certain distance from the object 1.

Further, the frame rate of the image frames enables determining, e.g. computing, of a time value, e.g. in unit seconds, from the provided measure, e.g. the representative value, when it denotes a number of frames. Hence, the speed estimation, e.g. a speed estimation value, can be determined in the present action based on the provided measure, e.g. representative value, said relation, e.g. said metric distance, and the frame rate used. For example, the speed estimation in meters per second, i.e. m/s, can be computed by dividing the metric distance with said time value in seconds.

If it is desirable that the motion encoder 10 itself makes the speed estimation and provides e.g. a speed estimate value as output. However, as should be realized, it may suffice and in some embodiments the motion encoder 10 provides said measure as output, which may be before or after said adjustment, and leaves it to post processing to make the speed estimation as such. This post processing may then be performed by another, e.g. separate unit, integrated or separate and/or remote from a unit comprising the motion encoder 10.

Figure 6A:
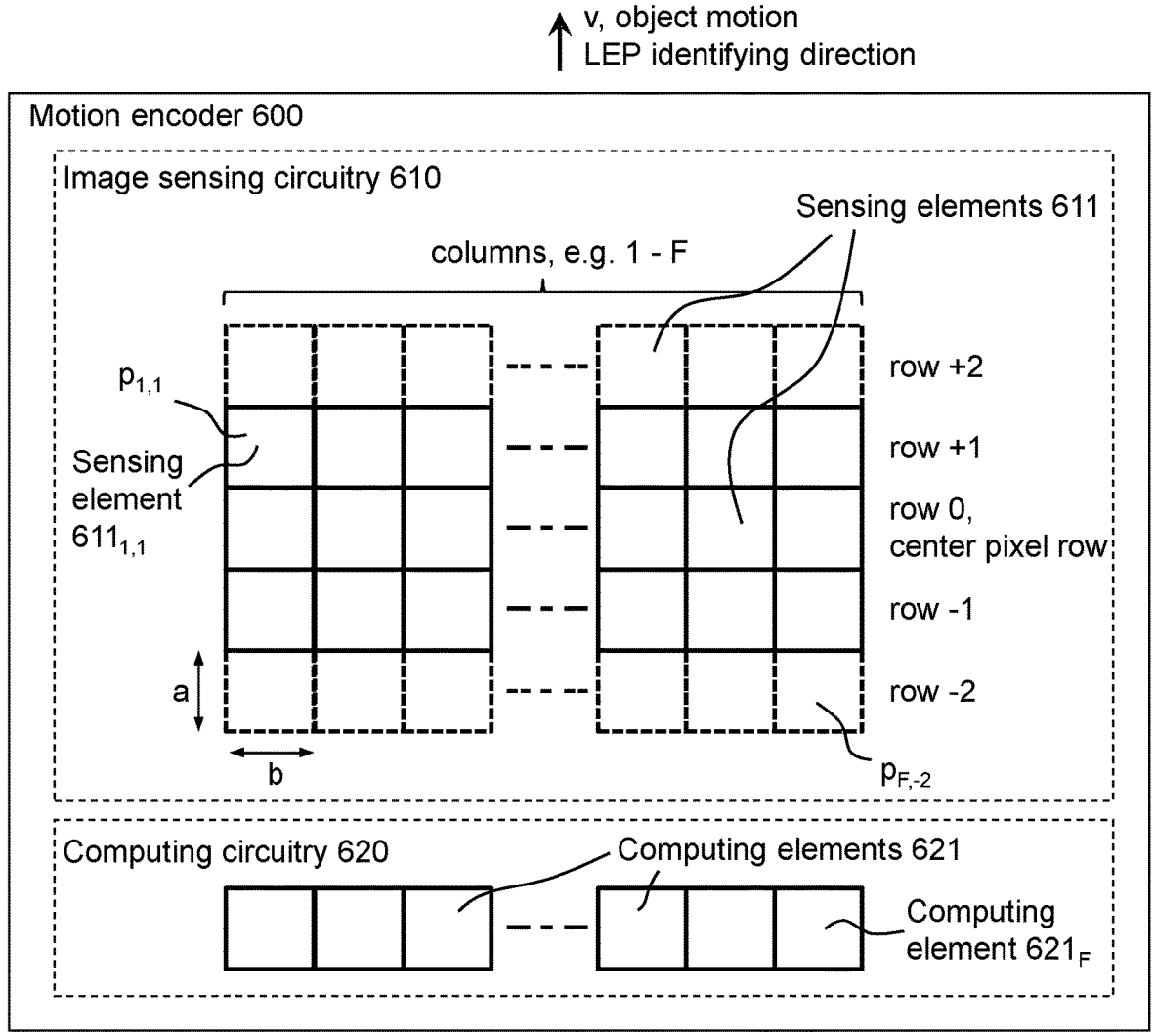
FIG. 6a is a block diagram schematically illustrating an NSIP hardware architecture that may be used to implement a motion encoder according to embodiments herein.

FIG. 6a is a block diagram schematically illustrating an NSIP hardware architecture that may be used to implement a motion encoder 600 according to embodiments herein. The motion encoder 600 may be configured to perform the method and actions discussed above in connection with FIG. 5.

As mentioned above, the motion to be indicated, e.g. by a speed estimate, is in a direction that is perpendicular to an optical axis of the image sensing circuitry, e.g. image sensor, providing the image frames of the object 1 during the motion. This can also be explained as the motion to be indicated by the measure is in a direction that is parallel to the image plane of the image sensing circuitry. The image sensing circuitry may e.g. be an image sensing circuitry 610 as shown in the figure where it is shown comprised in the motion encoder 600.

The image sensing circuitry 610 comprises sensing elements 611 including e.g. including a sensing element $611_{1,1}$ indicated in the figure. Each sensing element, e.g. the sensing element $611_{1,1}$, provides image data of a pixel in a corresponding position, i.e. pixel position, e.g. a pixel position $p_{1,1}$ for sensing element $611_{1,1}$, as shown in the figure. Another pixel position $p_{F,-2}$ is also marked in the figure just to illustrate the principle. Each of the sensing elements 611 of the image sensing circuitry 610, e.g. the sensing element $611_{1,1}$, may e.g. comprise or correspond to the light sensing parts a-f shown in FIG. 2. The sensing elements 611 in the figure are arranged in rows and columns. As illustrated, the sensing elements 611 may be arranged in F columns, F being an integer, and may thus may be numbered 1-F respectively. Further, the sensing elements 611, and thus also pixels respectively, may be arranged in 3 rows with a center row that may be numbered 0 and a preceding row to the center row that may be numbered −1 and a succeeding row that may be numbered +1. In some embodiments the sensing elements 611 are arranged in 5 rows, where the two additional rows may be numbered +2 and −2 respectively. Hence, a sensing element of the image sensing circuitry 610 may be referred to by its location or position by column and row. For example, the sensing element $611_{1,1}$ shown in the figure may be referred to as the sensing element in columns 1 and row 1 and may thus provide an image data value of a pixel in pixel position $p_{1,1}$. Hence, a pixel in an image frame, which pixel is provided by a sensing element in a column x of the columns 1-F and is located in the center row 0, may be denoted by its position $p_{x,0}$. With reference to the pixel positions p1-p3 discussed above in connection with FIG. 5, pixel position p1 may thus e.g. correspond to a pixel $p_{1,0}$, p2 to a pixel $p_{2,0}$ and p3 to a pixel $p_{3,0}$, i.e. the positions may correspond to first three sensing elements, i.e. of columns 1-3, in the center row 0, and image data of pixel position p1-p3 may thus be provided by said sensing elements, respectively.

As mentioned above it may be advantageous if said at least two pixel positions that LEPs are identified in relation to, are aligned with each other and with the pixel position of the local extreme point, e.g. are provided by sensing elements 611 of the image sensing circuitry 610 which are in the same column. The LEPs in this case may be identified by comparing image data of a pixel position in the center row with the closest preceding and succeeding pixel positions in the same column. For example, a LEP in $p_{1,0}$, may be identified by comparing an image data value of $p_{1,0}$ with image data values of $p_{1,1}$ and $p_{1,-1}$. Or in general, identifying whether there is a LEP or not in a pixel position $p_{x,0}$, where x may be any one of columns 1-F, may be done by comparing an image data value of $p_{x,0}$ with image data values of $p_{x,-1}$ and $p_{x,1}$, and possibly also with image data values of $p_{x,-2}$ and $p_{x,2}$.

In general, the image sensing circuitry 610 may comprise a total number of F×H sensing elements 611, and thus pixels, where H denotes a number of rows and F the number of columns. This total number corresponds to a resolution of the image sensing circuitry 610. The sensing elements 611 may as shown be arranged in a matrix, i.e. F>1 and H>1, or in a line or single row, i.e. H=1, F>1. In case of a matrix, the image circuitry 610 may be referred to as a two dimensional, 2D, image sensor or 1.5D image sensor, where 1.5D may be used to indicate that the numbers of rows and columns differ to a greater extent than conventionally for a 2D image sensor, i.e. that F>>H. For embodiments herein it is preferred with 3 or 5 rows as illustrated in the figure and a number of columns F>>5. For example, the number of columns, i.e. F, can in practice be expected to be in the magnitude of 100 and e.g. in the range of 128 or 256.

The sensing elements 611, and thereby corresponding pixels, may be associated with a certain form factor. The form factor may be given by a ratio a/b, where a and b are indicated in the figure for one of the sensing elements 611. The ratio is thus 1 when there is a square shape.

Further, the motion encoder 600 comprises a computing circuitry 620, which also may be named e.g. a processing circuitry or similar, for operating on the output, i.e. image data, from the sensing circuitry 610, in particularly on local image data, such as on image data values of individual pixels. The computing circuitry 620 comprises computing elements 621 including e.g. a computing element $621_F$ indicated in the figure. The computing elements 621 may alternatively be named pixel processors or bit processors and each computing element may e.g. comprise or correspond to the bit-serial arithmetic-logical unit g shown in FIG. 2.

Each of the computing elements 621, including the computing element $621_F$, may be associated with, and be configured to operate on image data from, one and/or a group of the sensing elements 611 and thereby also be associated with corresponding one or more pixel positions, typically in a predetermined manner and/or e.g. determined by and according to a hardware architecture being used, e.g. according to a certain NSIP chip or circuitry being used. For example, in the shown figure, the computing element $621_F$ may be configured to operate on image data from the sensing elements in the same column, in the shown example thus in column F. The computing elements 621 may be particularly associated with, e.g. integrated with, some sensing elements 611. In the figure the shown single row of computing elements may be particularly associated with sensing elements of the center pixel row, respectively, and may be named computing elements $611_{1-F}$.

Further, in the figure an arrow is indicating a direction of object motion, e.g. a direction of object motion with a speed v. In some embodiments, the measure indicative of the motion, e.g. speed estimate, will be in a direction for which LEPs are identified by the motion encoder 600. That is, as have been exemplified above, by comparing image data value of a pixel in the center row, i.e. row 0, e.g. $p_{x,0}$ with the closest neighboring pixels in the same column, i.e. $p_{x,-1}$ and $p_{x,1}$. The motion encoder 600 should thus be arranged accordingly when installed for use in relation to a motion to be indicated, i.e. in relation to a known or expected motion direction of the object, e.g. conveyor belt, so that the motion direction will be as indicated in the figure. That is, so that the motion direction will be perpendicular to an optical axis of the image sensing circuitry 610, which optical axis in this example is perpendicular to the shown image plane that comprises the sensing elements 611, and so that the motion direction will be along the columns 1-F.

To sum up, in an NSIP case, the computing elements 621 may be integrated with the sensing elements 611 of the center row, thus forming center row elements, each center row element may comprise a photodiode, a comparator, a simple logic unit, and some memory. The sensing element adjacent to the center row, i.e. in rows −1, +1, and in some embodiments −2, +2, may in turn each comprise a photodiode and a comparator. The output, i.e. image data, from these adjacent pixels sensing elements are processed by the sensing elements of the center row, i.e. by the logical units of the center row, so that e.g. image data, e.g. bit values, of pixel $p_{x,-1}$ and of pixel $p_{x,+1}$ are processed by the computing element in the same column x, i.e. corresponding to pixel position $p_{x,0}$ etc.

As should be understood, an image frame will in the context of the architecture shown in FIG. 6a correspond to a set of image data provided by the sensing elements 611 from one and the same exposure to light.

Figure 6B:
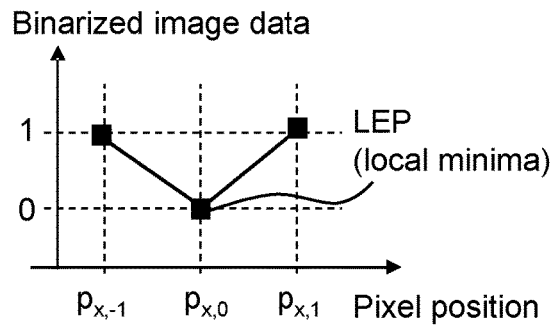
FIGS. 6b-c are schematic diagrams for illustrating LEPs in a situation with binarized image data.
Figure 6C:
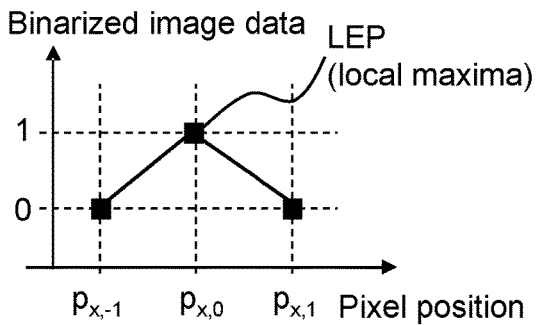

FIGS. 6b-c schematically illustrate how binarized image data for closest neighboring pixel positions $p_{x,-1}$, $p_{x,1}$ to a certain pixel position $p_{x,0}$ should be valued in order for binarized image data of said certain pixel position to be identified as a LEP. The figures show LEPs in the form of a local minima and local maxima, respectively.

Although the algorithms and methods according to embodiments herein, such as according to b1-b5 described above and the actions described in connection with FIG. 5, may replace a conventional image matching procedure for a motion encoder, and enable implementation by NSIP, there may be embodiments that are not suitable to directly use for practical implementation in an existing NSIP architecture.

In some embodiments, mainly because the number of required LEP runs may be quite large and may be image dependent, the length of each run may need to be stored until averaging can be done over all the runs. This may be unsuitable for an NSIP implementation due to the Single Instruction Multiple Data (SIMD) character. For this reason it may be introduced a further simplifying step, as already have been indicated above in connection with FIG. 5, namely to retain only the longest run for each of the computing elements, i.e. pixel processors, during the sequence of image frames. Said representative value indicative of the average may then be computed for the longest runs, i.e. over the number of retained runs, which is at most one per computing element since it may happen that there is no LEP run at all for some computing elements. In terms of 1-F columns of FIG. 6, with F computing elements, there may be averaging over F runs. The resulting average of these LEP runs may then correspond to a pre-measure or first estimate of the motion. However, as the runs have integer length it is typically necessary to compensate for the bias that occurs towards longer runs when only the longest run from each computing element, i.e. pixel processor, e.g. from the computing element 611, is retained. As an example, if a true motion, i.e. speed, corresponds to 5.5 frames per pixel, runs of length 5 and length 6 should occur equally often. But if the number of LEP runs seen by the computing element 611 happens to be e.g. 4, the probability that a run length of 6 is reported from this processor will be as high as $1-0.5^4=0.94$. This is based on the realization that 5 will only be reported from the computing element 611 if all 4 runs of that computing element happens to be of length 5 and the probability for this when the true motion corresponds to 5.5 frames, is $0.5^4$. The probability for 6 to be reported is thus $1-0.5^4$. With similar behavior from other computing elements, a representative value for all computing elements and that may be provided as the measure indicative of the motion, may then be 5*0.06+6*0.94=5.94, which is far from the correct value of 5.5. It is thus typically desirable to apply some correction to the pre-measure to get an improved measure to provide as the measure indicative of the motion. As realized from the above, the correction may be based on the number of LEPs seen by each computing element, as also indicated above in connection with FIG. 5. Such number can be comparatively simply be computed, such as counted, and stored per computing element, e.g. the computing element 621, of an NSIP architecture, such as of the motion encoder 600.

In some embodiments, already mentioned above in relation to FIG. 5 and FIG. 6, the representative value representing a single duration is based on counts of how many local extreme points that occur per duration value. For example, for each image frame, each of e.g. the computing elements 621, e.g. a computing element $\mathbf{621}_x$, may detect presence of a LEP in its corresponding pixel position, e.g. in $p_{x,0}$. If there in an ongoing LEP run and there is no longer a LEP in the pixel position for an image frame, the ongoing LEP run has been finalized. The sensing element $\mathbf{611}_x$ may then have or be considered to have a status "LEP run finalized" or similar for this frame and have a duration value indicating a duration of consecutively occurring LEPs, i.e. indicating the length or duration of the finalized LEP run, i.e. a run length. The computing element $\mathbf{621}_x$ may then indicate, e.g. by setting a bit or bits, that it has this information i.e. a new duration value of a certain length, and/or has finalized a LEP run. There may then be resources, such as some common logic for the computing elements $\mathbf{621}_{1-F}$ and that may be comprised in the computing circuitry 620, which obtains this information and similar corresponding information from the other sensing elements. For example, this logic may update a single count per duration value, or at least per duration value in a relevant range of duration values, for all pixel positions that are counting LEP runs. That is, the total counts per duration value for all pixel positions that LEP runs are counted for can be made available this way and it will basically correspond to a histogram with an available distribution of duration values, i.e. length of LEP runs. For example, if there is access to a COUNT network or similar as in the LAPP1100, a controlling processor common for all computing elements $\mathbf{621}_{1-F}$ may e.g. simply count bits that have been set by the computing elements $\mathbf{621}_{1-F}$ as described above in order to find out how many computing elements that for each frame have ended a LEP run and of which length and then keep count of this per duration value.

Hence, this way it is possible to keep track of and access information, in run time, about duration vales that have been computed by the computing elements $\mathbf{621}_{1-F}$ and how many occurrences there have been so far of each duration value, i.e. since the first image frame of a current sequence of image frames.

The information may at any time be processed, e.g. by filtering, also during run time, to compute the representative value, e.g. based on the two most frequently occurring duration values between which a representative value representing an actual duration should be located. The representative value may e.g. be computed when two most frequently occurring duration values are clearly recognizable. No further image frames of the sequence may then need to be produced and/or used.

When a moving surface, e.g. of the object 1, such as an conveyor belt, is being imaged by the image frames and this surface is parallel to the image plane of the image sensing circuitry, e.g. of the image sensing circuitry 610, the object distance as mentioned above is the same across the sensor columns, i.e. each identified LEP in the columns will concern a distance and area that is equally large on the surface. As indicated above, it may be desirable if LEP runs are not too long but e.g. 10-20 frames in order to accomplish fast response time. This means however that the precision, e.g. in a speed estimate, due to rounding effects may be lower than what is desirable. A way to reduce these effects may be to apply different form factors for the sensing elements in different columns. E.g. so that there is a gradient of sensing element having a greater width of their light sensitive area when crossing the columns, such as an increased b with reference to FIG. 6a and the motion encoder 600. However, a simpler way of achieving a similar effect may be to in a controlled manner, e.g. predetermined and/or predefined manner, arrange the image sensing circuitry in a tilted relation to the object surface, so that the distance to the surface become different for different columns. For example so that sensing elements of column 1 are closest to said object surface and sensing elements of column F are furthest away from the object surface. This should be done while in the direction of motion keeping a substantially orthogonal orientation between the object surface and the optical axis of the image sensing circuitry. This way the distribution of the duration values can be made to vary in a controlled way across the columns due to variation in object distances and "magnification". This enables higher precision in the measure and e.g. a speed estimate. It can be used to achieve a desired jitter or spread of the LEP runs across the columns to thereby be able to increase precision.

It has been found that a circuit implementing the motion encoder 600 may need to be clocked at least at 25 MHz, which is reasonable compared to known implementations of NSIP sensors, e.g. those referred to above. However, if a light sensitive area of the sensing elements is of size a×b as illustrated in FIG. 6, and the pixel form factor a/b is adjusted to 10, i.e. the length of the pixel side along the array, b, is 10 times smaller than the other side, a, the line rate may be reduced by a factor of 10.

Figure 7:
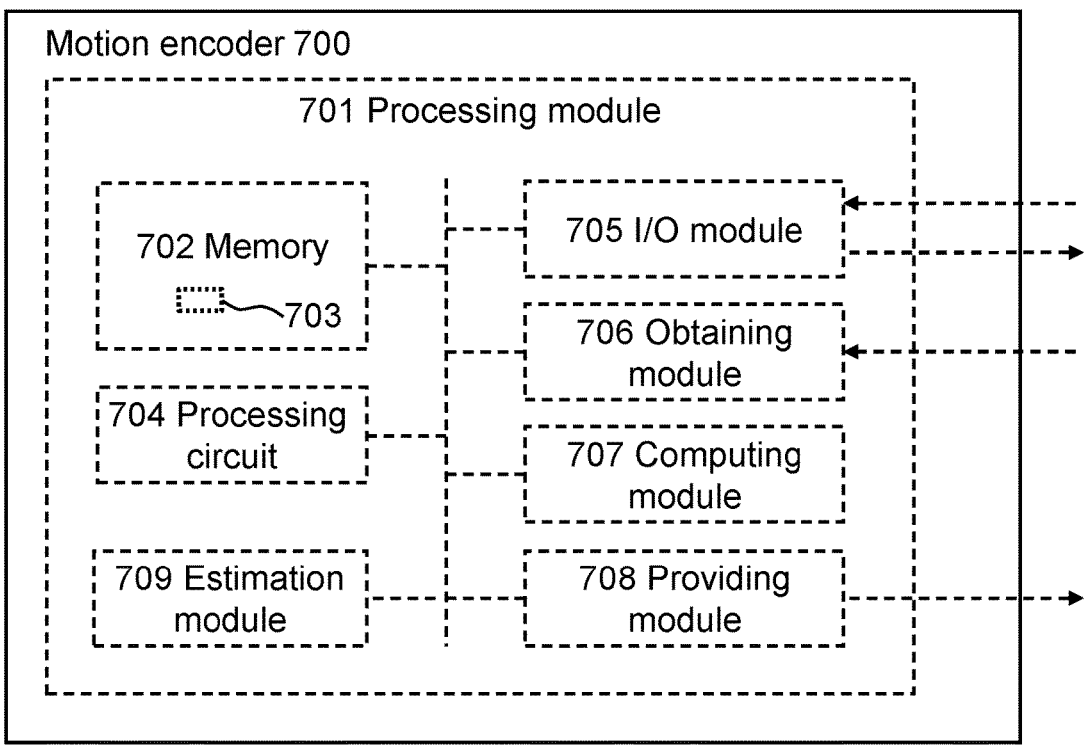
FIG. 7 is a functional block diagram for illustrating embodiments of the motion encoder according to embodiments herein and how it can be configured to carry out the method.

FIG. 7 is a schematic block diagram for illustrating embodiments of how a motion encoder 700 that e.g. may correspond to the motion encoder 10 and/or 600, may be configured to perform the method and actions discussed above in connection with FIG. 5. Hence, the motion encoder 700 is for providing said measure indicative of motion of an object, e.g. the object 1, such as conveyor belt. The motion is relative to an image sensing circuitry, e.g. the image sensing circuitry 610, and in a direction, e.g. in the direction of motion indicated in FIG. 4 and/or FIG. 6, that is perpendicular to an optical axis of the image sensing circuitry when the image sensing circuitry provides image frames sequentially imaging at least part of the object 1 during the motion.

The motion encoder 700 may comprise a processing module 701, such as a means, one or more hardware modules, including e.g. one or more processors, and/or one or more software modules for performing said methods and/or actions. The processing module 701 may in some embodiments comprise the computing circuitry 620 and in some embodiments also the image sensing circuitry 610.

The motion encoder 700 may further comprise a memory 702 that may comprise, such as contain or store, a computer program 703. The computer program 703 comprises 'instructions' or 'code' directly or indirectly executable by the motion encoder 700 so that it performs said methods and/or actions. The memory 702 may comprise one or more memory units and may further be arranged to store data, such as configurations and/or applications involved in or for performing functions and actions of embodiments herein.

Moreover, the motion encoder 700 may comprise a processing circuit 704 as an exemplifying hardware module and may comprise or correspond to one or more processors. The processing circuit 704 may in some embodiments fully or partly correspond to the computing circuitry 620. In some embodiments, the processing module 701 may comprise, e.g. 'is embodied in the form of' or 'realized by', at least partly, the processing circuit 704. In these embodiments, the memory 702 may comprise the computer program 703 executable by the processing circuit 704, whereby the motion encoder 700 is operative, or configured, to perform said method and/or actions thereof.

Typically the motion encoder 700, e.g. the processing module 701, comprises an Input/Output (I/O) module 705, configured to be involved in, e.g. by performing, any communication to and/or from other units and/or devices, such as sending and/or receiving information to and/or from these other units and/or devices. The I/O module 705 may be exemplified by an obtaining, e.g. receiving, module and/or a providing, e.g. sending, module, when applicable.

Further, in some embodiments, the motion encoder 700, e.g. the processing module 701, comprises one or more of an obtaining module 706, a computing module 707, a providing module 708 and an estimation module 709 as exemplifying hardware and/or software module(s). These modules may be fully or partly implemented by the processing circuit 704. Hence, the motion encoder 700, and/or the processing module 701, and/or the processing circuit 704, and/or the I/O module 705, and/or the obtaining module 706 are operative, or configured, to obtain the image data of said sequence of said image frames.

For example, in an implementation based on the architecture shown in FIG. 6, hardware and software of the computing circuitry 620, and that may correspond to the obtaining module 706, may be configured to obtain the image data from the image sensing circuitry 610. This hardware and software may in turn comprise hardware and software configured to make a computing element, e.g. the computing element $621_F$, to obtain image data from the sensing elements in the same column, e.g. all sensing elements of column F.

Further, the motion encoder 700, and/or the processing module 701, and/or the processing circuit 704, and/or the computing module 707 are operative, or configured, to compute, for said at least one pixel position of said sequence of image frames and based on the obtained image data, said at least one duration value.

For example, in an implementation based on the architecture shown in FIG. 6, hardware and software of the computing circuitry 620, and that may correspond to the computing module 708, may be configured to compute said at least one duration value, typically multiple duration values, for pixel positions corresponding to the center pixel row, i.e. row 0. This hardware and software may in turn comprise hardware and software configured to make each single computing element, e.g. the computing element $621_F$, to compute one or more duration values for a pixel position associated with the computing element, e.g. pixel position $p_{F,0}$ for computing element $621_F$.

Moreover, the motion encoder 700, and/or the processing module 701, and/or the processing circuit 704, and/or the I/O module 705, and/or the providing module 708 are operative, or configured, to, provide, based on said at least one duration value, said measure.

For example, in an implementation based on the architecture shown in FIG. 6, hardware and software of the computing circuitry 620, and that may correspond to the providing module 708, may be configured to provide the measure.

In some embodiments, the motion encoder 700, and/or the processing module 701, and/or the processing circuit 704, and/or the computing module 707 are operative, or configured, to estimate, based on the provided measure, said speed of the object in said direction.

For example, in an implementation based on the architecture shown in FIG. 6, hardware and software of the computing circuitry 620, and that may correspond to the estimation module 709, may be configured to estimate said speed.

Also, in some embodiments, the motion encoder 700, and/or the processing module 701, and/or the processing circuit 704, and/or the computing module 707 are further operative, or configured, to compute, for said at least one pixel position, said representative value.

For example, in an implementation based on the architecture shown in FIG. 6, hardware and software of the computing circuitry 620, and that may correspond to the computing module 708, may be configured to compute, for said at least one pixel position, said representative value.

Figure 8A:
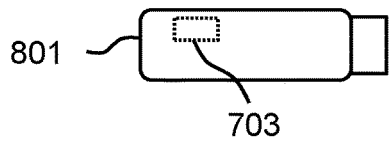
FIGS. 8a-c are schematic drawings illustrating embodiments relating to computer program products and a computer program to cause the motion encoder to perform said method.
Figure 8B:
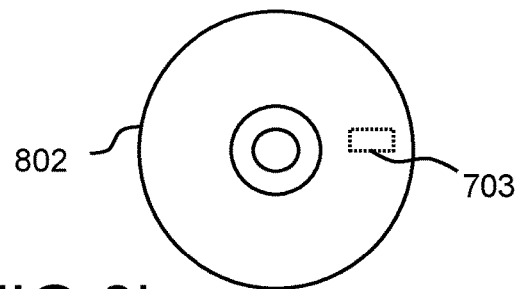
Figure 8C:
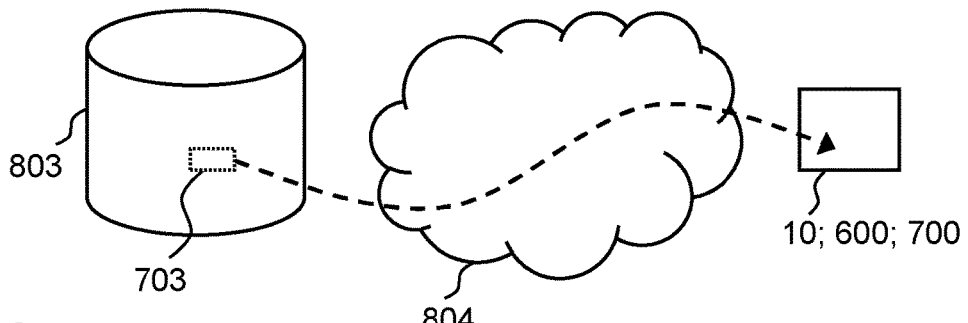

FIGS. 8*a-c* are schematic drawings illustrating embodiments relating to a computer program that may be the computer program 703 and that comprises instructions that when executed by the processing circuit 704 and/or the processing modules 701 causes the motion encoder 700 to perform as described above.

In some embodiments there is provided a carrier, such as a data carrier, e.g. a computer program product, comprising the computer program 703. The carrier may be one of an electronic signal, an optical signal, a radio signal, and a computer readable medium. The computer program 703 may thus be stored on the computer readable medium. By carrier may be excluded a transitory, propagating signal and the carrier may correspondingly be named non-transitory carrier. Non-limiting examples of the carrier being a computer-readable medium is a memory card or a memory stick 801 as in FIG. 8*a*, a disc storage medium 802 such as a CD or DVD as in FIG. 8*b*, a mass storage device 803 as in FIG. 8*c*. The mass storage device 803 is typically based on hard drive(s) or Solid State Drive(s) (SSD). The mass storage device 803 may be such that is used for storing data accessible over a computer network 804, e.g. the Internet or a Local Area Network (LAN).

The computer program 703 may furthermore be provided as a pure computer program or comprised in a file or files. The file or files may be stored on the computer-readable medium and e.g. available through download e.g. over the computer network 804, such as from the mass storage device 803 via a server. The server may e.g. be a web or File Transfer Protocol (FTP) server. The file or files may e.g. be executable files for direct or indirect download to and execution on the motion encoder 700, to perform as described above, e.g. by the processing circuit 704. The file or files may also or alternatively be for intermediate download and compilation involving the same or another processor to make them executable before further download and execution causing the motion encoder 700 to perform as described above.

Note that any processing module(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC). However, as already discussed above, the motion encoder of embodiments herein is preferably implemented on an NSIP architecture, e.g. on a chip implementation of a NSIP type of processor, such as the LAPP1100 chip or similar. Some embodiments herein may be realized by programming, such as by installing the computer program 703, on an NSIP chip.

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors make the motion encoder 700 to be configured to and/or to perform the above-described actions of embodiments herein.

Note that in case it is possible and/or suitable, one or more embodiments herein, e.g. relating to one or more methods and/or entities, can be implemented in one and the same physical arrangement or entity.

As used herein, the term "unit" may refer to one or more functional units, each of which may be implemented as one or more hardware modules and/or one or more software modules in a node.

As an example, the expression "means" may be a module corresponding to the modules listed above in conjunction with the figures.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology used herein, such as first method, second method, and first arrangement, second arrangement, etc., and the like, as may be used herein, as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit, a bit string or word.

As used herein, the expression "in some embodiments" has been used to indicate that the features of the embodiment described may be combined with any other embodiment disclosed herein.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a motion encoder, for providing a measure indicative of motion of an object, which motion is relative to an image sensing circuitry and in a direction that is perpendicular to an optical axis of the image sensing circuitry when the image sensing circuitry provides image frames sequentially imaging at least part of said object during the motion, wherein the method comprises:
obtaining image data of a sequence of said image frames,
computing, for at least one pixel position of said sequence of image frames and based on the obtained image data, at least one duration value, each duration value indicating a duration of consecutively occurring local extreme points in said sequence of image frames, wherein a local extreme point is present in a pixel position if an image data value of that pixel position is a maxima or minima in relation to image data values of at least two pixel positions that are closest neighbors to said pixel position, and
providing, based on said at least one duration value, said measure indicative of the motion.

2. The method as claimed in claim 1, wherein the method further comprises:
estimating, based on the provided measure, a speed of the object in said direction.

3. The method as claimed in claim 1, wherein said at least one duration value is multiple duration values and the method further comprises:
computing, for said at least one pixel position and based on said multiple duration values, a representative value representing a single duration that is an estimate of an actual duration, and
wherein said measure is based on said representative value.

4. The method as claimed in claim 3, wherein said at least one pixel position is multiple pixel positions and the representative value is based on duration values being identified as indicative of the longest duration per pixel position of said multiple pixel during the sequence of image frames.

5. The method as claimed in claim 4, wherein the representative value comprises an adjustment based on how many local extreme points that occur in said multiple pixel positions during the sequence of image frames.

6. The method as claimed in claim 3, wherein the representative value is based on counts of how many local extreme points that occur per duration value.

7. The method as claimed in claim 6, wherein the representative value is based on an identification of the two most frequently occurring duration values according to the counts.

8. The method as claimed in claim 1, wherein said at least two pixel positions are aligned with each other and the pixel position of the local extreme point.

9. The method as claimed in claim 8, wherein said at least two pixel positions comprise the closest preceding and closest subsequent pixel positions and the second closest preceding and second closest subsequent pixel positions.

10. A motion encoder for providing a measure indicative of motion of an object, which motion is relative to an image sensing circuitry and in a direction that is perpendicular to an optical axis of the image sensing circuitry when the image sensing circuitry provides image frames sequentially imaging at least part of said object during the motion, wherein the motion encoder is configured to:
obtain image data of a sequence of said image frames,
compute, for at least one pixel position of said sequence of image frames and based on the obtained image data, at least one duration value, each duration value indicating a duration of consecutively occurring local extreme points in said sequence of image frames, wherein a local extreme point is present in a pixel position if an image data value of that pixel position is a maxima or minima in relation to image data values of at least two pixel positions that are closest neighbors to said pixel position, and
provide, based on said at least one duration value, said measure indicative of the motion.

11. The motion encoder as claimed in claim 10, wherein the motion encoder is further configured to:
estimate, based on the provided measure, a speed of the object in said direction based on the provided measure.

12. The motion encoder as claimed in claim 10, wherein said at least one duration value is multiple duration values and the motion encoder is further configured to:
compute, for said at least one pixel position and based on said multiple duration values, a representative value representing a single duration that is an estimate of an actual duration, and
wherein said measure is based on said representative value.

13. The motion encoder as claimed in claim 12, wherein said at least one pixel position is multiple pixel positions and the representative value is based on duration values being identified as indicative of the longest duration per pixel position of said multiple pixel positions during the sequence of image frames.

14. A non-transitory computer readable medium comprising computer executable instructions that when executed by a motion encoder causes the motion encoder to perform the method according to claim 1.

15. A carrier comprising the non-transitory computer readable medium according to claim 14.

16. The method as claimed in claim 2, wherein said at least one duration value is multiple duration values and the method further comprises:
computing, for said at least one pixel position and based on said multiple duration values, a representative value representing a single duration that is an estimate of an actual duration, and
wherein said measure is based on said representative value.

17. The motion encoder as claimed in claim 11, wherein said at least one duration value is multiple duration values and the motion encoder is further configured to:
compute, for said at least one pixel position and based on said multiple duration values, a representative value representing a single duration that is an estimate of an actual duration, and
wherein said measure is based on said representative value.

* * * * *